United States Patent

Zeidler

[19]

[11] Patent Number: 6,033,543
[45] Date of Patent: Mar. 7, 2000

[54] ELECTROCHEMICAL SENSOR

[75] Inventor: Willi Zeidler, Wertheim, Germany

[73] Assignee: Mettler-Toledo GmbH, Greifensee, Switzerland

[21] Appl. No.: 08/991,617

[22] Filed: Dec. 16, 1997

[30] Foreign Application Priority Data

Apr. 24, 1997 [CH] Switzerland .............................. 0958/97

[51] Int. Cl.⁷ .................................................. G01N 27/36
[52] U.S. Cl. ........................................... 204/420; 204/433
[58] Field of Search ................................... 204/416, 418, 204/419, 420, 433

[56] References Cited

U.S. PATENT DOCUMENTS

| | | |
|---|---|---|
| 2,755,243 | 7/1956 | Beckman et al. . |
| 3,444,068 | 5/1969 | Leonard et al. . |
| 3,666,651 | 5/1972 | Makabe . |
| 3,880,737 | 4/1975 | Brunt . |

FOREIGN PATENT DOCUMENTS 0 517 032 B1   8/1996   European Pat. Off. .

*Primary Examiner*—Robert J. Warden, Sr.
*Assistant Examiner*—Jennifer C. McNeil
*Attorney, Agent, or Firm*—Laubscher & Laubscher

[57] ABSTRACT

A method of producing a medium-tight connection between interior and exterior concentrically-arranged glass tubes includes the steps of providing a longitudinally extending electrical conductor strip between the interior and exterior tubes, forming a bulge extending radially outwardly from the interior tube by heating the tube, inserting the interior tube into the exterior tube, and forming a constriction in the exterior tube which extends radially inwardly and connects with the radially outwardly extending bulge to form a closure area, whereby the conductor strip passes through the closure area. An electrochemical sensor for measuring pH values or redox potentials formed according to this method includes an elongated housing which contains an interior chamber defined by the interior tube, a glass membrane cap, and a closure member, and an annular exterior chamber defined by the interior and exterior tubes. The interior chamber contains a buffer solution which covers at least a portion of a working electrode, the working electrode being further connected with an electrical line which passes through the closure member for connection with a connection point located outside of the interior chamber. The exterior chamber contains a reference solution which covers at least a portion of a reference electrode, the reference electrode being connected with an electrical line which extends from the exterior chamber through the medium-tight connection area formed in accordance with the invention to a connection point located outside of the exterior chamber.

9 Claims, 3 Drawing Sheets

ELECTROCHEMICAL SENSOR

BACKGROUND OF THE INVENTION

The present invention relates to a method for making an annular, medium-tight connection between concentrically arranged glass tubes with medium-tight inclusion of an elongated electrical conductor strip for use in an electrochemical sensor.

Electrochemical sensors, such as pH sensors, ion selective sensors, and redox sensors, must be equipped with electrical conductors to allow electrical signals to be transmitted to and from electrodes contained within the sensor. As a rule, the electrodes dip into a buffer or reference electrolyte solution in the interior space of the sensor. In order to allow for proper handling, transportation, and employment of the sensor, the interior space of the sensor must be provided with a medium-tight closure to prevent the solution or solutions contained therein from leaking. Thus, the electrical conductors must pass through a medium-tight passage between the interior space of the sensor and the surrounding area.

BRIEF DESCRIPTION OF THE PRIOR ART

Various electrochemical sensors are known in the prior art. The known medium-tight, circular connections are either xenogenous or autogenous. Xenogenous connections contain a foreign connecting material such as, for example, a sealing mass on an epoxide base, that is arranged between the glass tubes that are to be connected. The temperature range within which such connections can be used is limited to temperatures below approximately 60° C. By using special sealing masses on a silicon base, the temperature range may be extended up to about 130° C., but making such connections is expensive.

European Patent No. 0 517 031 B1 describes a cartridge-like diversion element for potentiometric measurement chains that is equipped with closure means formed as a xenogenous connection, whereby epoxide, silicon, or glass solder can be used. A sintered or melted xenogenous connection may be made by using glass solder.

The electrical insulation resistance or resistance between two separate electrical lines conducted via a common xenogenous connection is usually about $10^8$ to $10^{13}$ Ohm. Autogenous connections or connections without foreign connection material can be made by directly melting the appropriate portions of the glass tubes which are to be joined. Compared to xenogenous connections autogenous connections exhibit improved tightness stability against chemical and thermal influences, and an improved electrical insulation resistance of the electrical conductors that pass therethrough.

In known electrochemical sensors, metallic wires are normally arranged in the interior space of the sensor and serve to connect the electrodes to an external cable or plug. The use of wire-like lines, however, entails various disadvantages. The wires, with the necessary insulation, require a large amount of space, and reducing the insulation is possible only to a limited extent for physical reasons. Accordingly, the extent of miniaturization of the sensor, which is desirable or even required for certain applications, is limited. Moreover, the use of metallic wires, wire connections, and insulation housings makes it more difficult to automate the sensor production process. To simplify the production process and to avoid contact potentials, it is desirable to use the same material for the wire-like lines and the electrodes. In sensors having electrodes formed of a metal having a low melting temperature, such as, for example, silver, however, the otherwise advantageous melting of the wire-like lines made of the same metal into the glass is impossible. A xenogenous connection with the previously mentioned disadvantages must therefore be used. Of course, an autogenous connection may be used, but with an autogenous connection, the electrical conductor in the area of he connection must contain a wire piece made of a metal having a higher melting temperature, such as, for example, platinum. This includes the previously mentioned disadvantages.

In another type of known sensor, the electrical conductors are made as conductor strips. These conductor strips are made, for example, by applying a powdery metal that is present as a suspension in a resin or in a volatile solvent, and then, if necessary, fixing the conductor strip in place. In this manner, a more compact structure may be achieved, and the production effort and expenditure can be reduced. An autogenous, circular, medium-tight connection, including electrical conductor strips, however, cannot be accomplished with the known methods. For this reason, electrochemical sensors provided with lines in the shape of conductor strips must be equipped with xenogenous connections with the previously mentioned disadvantages.

SUMMARY OF THE INVENTION

Accordingly, it is a primary object of the present invention to provide a method for making an improved circular, medium-tight connection between concentrically arranged glass tubes with medium-tight inclusion of a continuous electrical conductor strip for use in electrochemical sensors.

It is a more specific object of the invention to provide a method for producing a circular, medium-tight connection between concentrically arranged glass tubes with medium tight inclusion of an elongated electrical strip-like conductor therebetween, including the steps of providing the electrical conductor strip between an interior and an exterior tube, forming a radially outwardly protruding bulge in the interior tube having an outer diameter slightly smaller than the inside diameter of the exterior tube by heating the appropriate portion of the tube, arranging the interior tube concentrically within the exterior tube, and forming a constriction in the exterior tube by heating a connection area of the exterior tube, whereby the two tubes are melted together with inclusion of the conductor strip. The conductor strip may be applied to either the outside surface of the interior tube or the inside surface of the exterior tube.

It is another object of the present invention to provide a method of producing a connection between a pair of concentrically arranged tubes in which the tubes are formed of a soft glass. The use of a soft glass is particularly suitable for making the medium-tight connection in an electrochemical sensor for measuring pH values because soft glass can be melted together with a glass membrane consisting of a pH glass which is commonly employed in such sensors.

It is a further object of the present invention to provide a method for producing a connection between concentrically arranged glass tubes in which the conductor strip is formed of a corrosion-resistant material such as, for example, gold, silver, or platinum. It is desirable to use a corrosion-resistant material since the interior chamber of the sensor contains a corrosive solution. The use of silver is particularly desirable because of its relatively low cost and its ability to provide a good connection with electrodes made of silver, especially reference electrodes for the measurement of pH values or redox potentials.

It is yet another object of the present invention to provide a method of producing a connection between concentrically arranged glass tubes in which the bulge in the interior glass tube is formed by heating an appropriate portion of the tube to a temperature between 600° C. and 800° C., thereby to permit controlled shaping of the bulge diameter and the pertinent wall thickness of the interior glass tube in the area of the connection, and further wherein the constriction in the exterior glass tube is formed by heating the tube to a temperature between 1000° C. and 1200° C., thereby to achieve optimal results regarding the melting between the internal and external tubes as well as the inclusion of the conductor strip.

It is another object of the present invention to provide an electrochemical sensor having an elongated housing formed by an interior tube, an exterior tube, a membrane cap, and a closure member. The housing further includes a first closure area formed by the bulge extending radially outwardly from the interior tube and the constriction extending radially inwardly from the exterior tube, and a second closure area formed by connected end portions of the interior and exterior tubes adjacent the membrane cap. By forming the housing in accordance with the method of the present invention, the first closure area provides a connection that has a good degree of tightness, a good degree of insulation resistance, and is resistant to chemical and thermal influences. The closure member, interior tube and membrane cap define a generally cylindrically-shaped interior chamber and the interior tube, exterior tube, first closure area, and second closure area define an annular exterior chamber.

The sensor further includes a reference element contained at least partially within the annular exterior chamber, a working element contained at least partially within the interior chamber, a reference solution contained within the annular exterior chamber, and a buffer solution contained within the interior chamber. The reference element includes a first or reference electrode arranged within the annular exterior chamber and a first electrical line extending from the annular exterior chamber through the first closure area to a connection point located outside the exterior chamber. To simplify the production process and to achieve a compact sensor structure, it is desirable to form the electrical conductor as a continuous part of the conductor strip. The conductor strip and electrode may be formed of different metals, but by using the same metal, undesirable contact potentials and mechanical stresses created at the point of connection between the conductor strip and the electrode are prevented. The electrochemical sensor may, for example, include a silver/silver chloride reference element with a silver electrode. A tubing segment is provided around the portion of the conductor strip that is submerged in the reference solution. The working element includes a second or working electrode and a second electrical conductor. The second electrical conductor extends through the closure member to a connection point located outside the interior chamber.

It is a further object of the present invention to provide an electrochemical sensor having a reference electrode including an ion selective sensor for measuring pH values.

It is yet another object of the present invention to provide an electrochemical sensor having a reference electrode including a redox sensor for measuring redox potentials.

BRIEF DESCRIPTION OF THE DRAWINGS

Other objects and advantages of the invention will become apparent from a study of the following specification when viewed in light of the accompanying drawing, in which.

DETAILED DESCRIPTION

Referring first to FIGS. 1–5, there is shown the sequence of steps used to make a circular, medium-tight connection 2 between an interior glass tube 4 and an exterior glass tube 6 arranged concentrically around the interior tube with medium-tight inclusion of an elongated electrical conductor strip 8. Each glass tube may be formed from a soft glass, such as, for example, lead glass.

Figure 1:
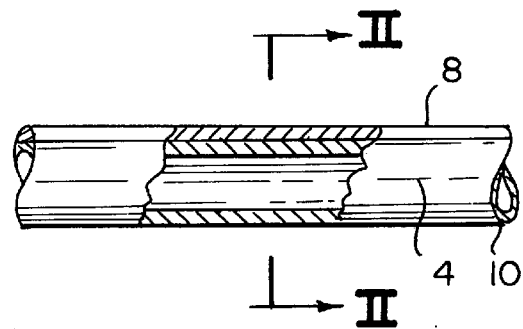
FIG. 1 is a partially sectioned side elevational view of an interior glass tube with a conductor strip applied thereto according to the first method step of the invention.
Figure 2:
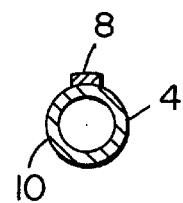
FIG. 2 is a cross-sectional view taken along line 2—2 of FIG. 1.

According to the first step shown in FIG. 1, an outer wall 10 of the interior glass tube 4 is provided with an elongated strip-shaped conductor strip 8 which extends in the longitudinal direction of the interior glass tube 4 via an annular connection area 12. The conductor strip may be made of a corrosion resistant metal such as, for example, silver. In the example shown, conductor strip 8 merely covers a small fraction of the circumference of outer wall 10, but it will be recognized that the method can also be applied to conductor strips that cover a larger fraction or the entire circumference of the glass tube. In addition, a plurality of essentially parallel conductor strips may be applied to the tubes.

Figure 3:
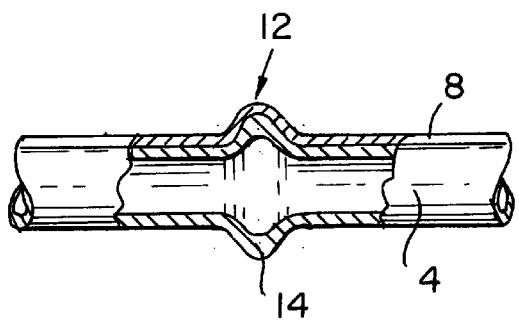
FIG. 3 is a partially sectioned elevational view of the interior glass tube of FIG. 1 with a bulge formed therein.

In accordance with the second step of the method shown in FIG. 3, a radially outwardly protruding bulge 14 is formed in the connection area 12 of the interior tube 4 by locally heating the annular connection area of the interior glass tube 4. For this purpose, it is advantageous to build up a slight excessive pressure in the interior glass tube 4 using, for example, a mouth-activated glass-blowing rubber hose. When soft glass is used, it is advantageous for heating purposes to employ a soft gas flame with a temperature of about 600° C. to 800° C., thereby to ensure a controlled shaping of bulge 14. The outside diameter of bulge 14 must be made somewhat smaller than the inside diameter of the exterior glass tube 6. For example, for an interior glass tube 4 with an outside diameter of 4 mm and an exterior glass tube 6 with an inside diameter of 10 mm, the bulge 14 would be made with an outside diameter of approximately 9 mm.

Figure 4:
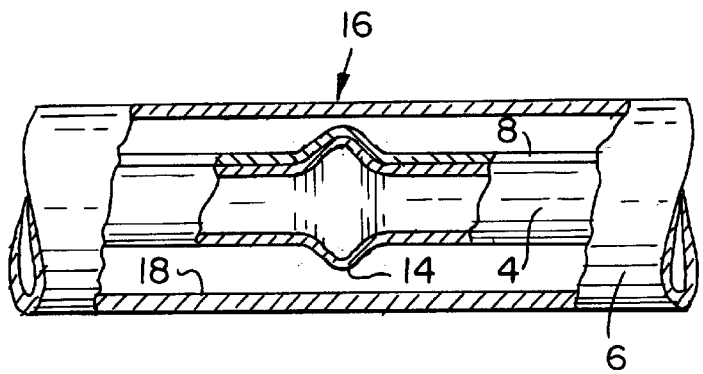
FIG. 4 is a partially sectioned elevational side view of the interior tube following insertion into an exterior tube.

In accordance with the third step of the method shown in FIG. 4 the interior glass tube 4 is concentrically inserted into the exterior glass tube 6 until bulge 14 is adjacent a connection area 16 of the exterior glass tube 6. Typically, the connection area 16 extends in the longitudinal direction of the exterior glass tube 6 over a length of 5 mm to 20 mm.

The glass tubes 4, 6 may be longitudinally and radially fixed with respect to each other by means of suitable expedients known in glass processing technology, such as graphite sleeves and/or rings.

Figure 5:
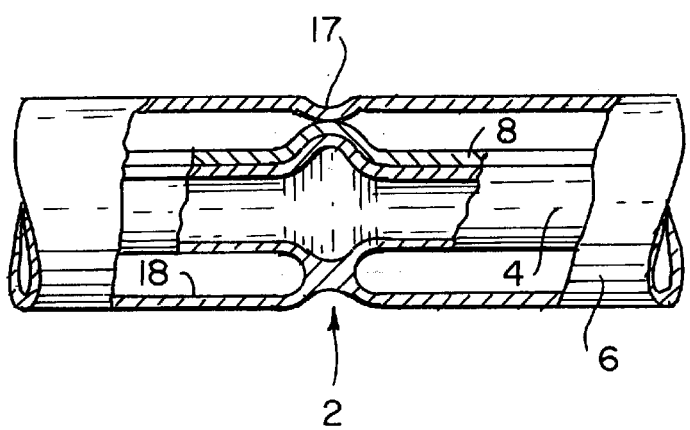
FIG. 5 is a partially sectioned view of the interior and exterior tubes of FIG. 4 after they have been melted together to form a connection.

In accordance with the fourth step of the method shown in FIG. 5, a constriction 17 extending radially inwardly is formed in the exterior tube 6 by locally heating connection area 16 of the exterior tube until the constriction is melted together with the protruding bulge 14 of interior glass tube 4 with medium-tight inclusion of conductor strip 8. For this purpose, it is advantageous to build up a slight pressure drop in the exterior glass tube 6 and/or slightly to press the ends of the exterior glass tube 6 against each other along the longitudinal direction of the exterior glass tube. For soft glass, melting is accomplished using a gas flame at a temperature of 1000° C. to 1200° C.

Figure 6:
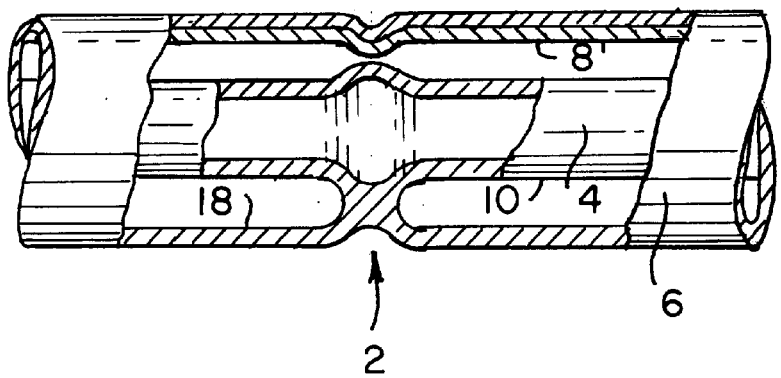
FIG. 6 is an alternate embodiment of the invention in which the conductor strip is attached to the inside surface of the exterior tube.

FIG. 6 shows the result of an alternative embodiment of the method where, in the first method step, a conductor strip 8' is attached to inside wall 18 of exterior glass tube 6 rather than the outside wall 10 of interior tube 4.

Figure 7:
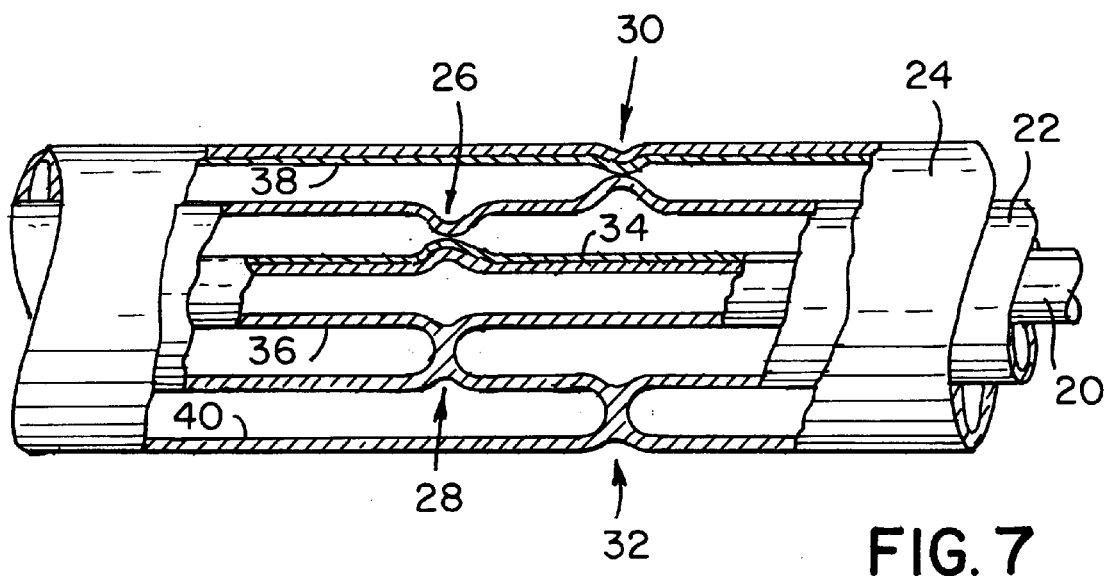
FIG. 7 is a partially sectioned side view of a second alternate embodiment of the invention including three concentric tubes.

FIG. 7 shows a concentric arrangement of interior 20, middle 22, and exterior 24 tubes wherein a first circular, medium-tight connection 28 is made in a first connection area 26 between the interior tube 20 and the middle tube 22 and where, in a second connection area 30 between the middle tube 22 and the exterior tube 24, there is made a second circular, medium-tight connection 32. To produce this arrangement, the four steps described previously are applied first to the interior tube and the middle tube 22. The same four steps are then repeated to connect the middle tube 22 with the exterior tube 24. As such, a first conductor strip 34 is attached to the outer wall 36 of interior glass tube 20 and the interior tube and middle tubes are connected as previously described. Next, a second conductor strip 38 is attached to the inside wall 40 of the exterior tube and the steps of forming a bulge in the middle tube 22, inserting the middle tube into the exterior tube 24, and forming a constriction in the exterior tube 24 to form the second medium-tight connection are performed. The two connection areas 26 and 30 are longitudinally offset or shifted relative to each other with respect to the length of the tubes.

In the above-described steps which involve locally heating the glass tubes using a gas flame, known precautions derived from glass processing technology are taken into account, such as continually rotating the glass tubes 4, 6 around the longitudinal axis during heating to avoid abrupt temperature changes. In addition, the two glass tubes 4, 6 are cooled down slowly over a period of several hours at the end of the fourth step. If necessary, conductor strip 8 is covered up at a suitable moment following completion of the first step in an area of the exterior glass tube 4 facing away from the connection area 12 of interior glass tube 4 using a covering means 42, for example, a shrink-fit synthetic plastic tubing that is slipped over interior glass tube 4.

Figure 8:
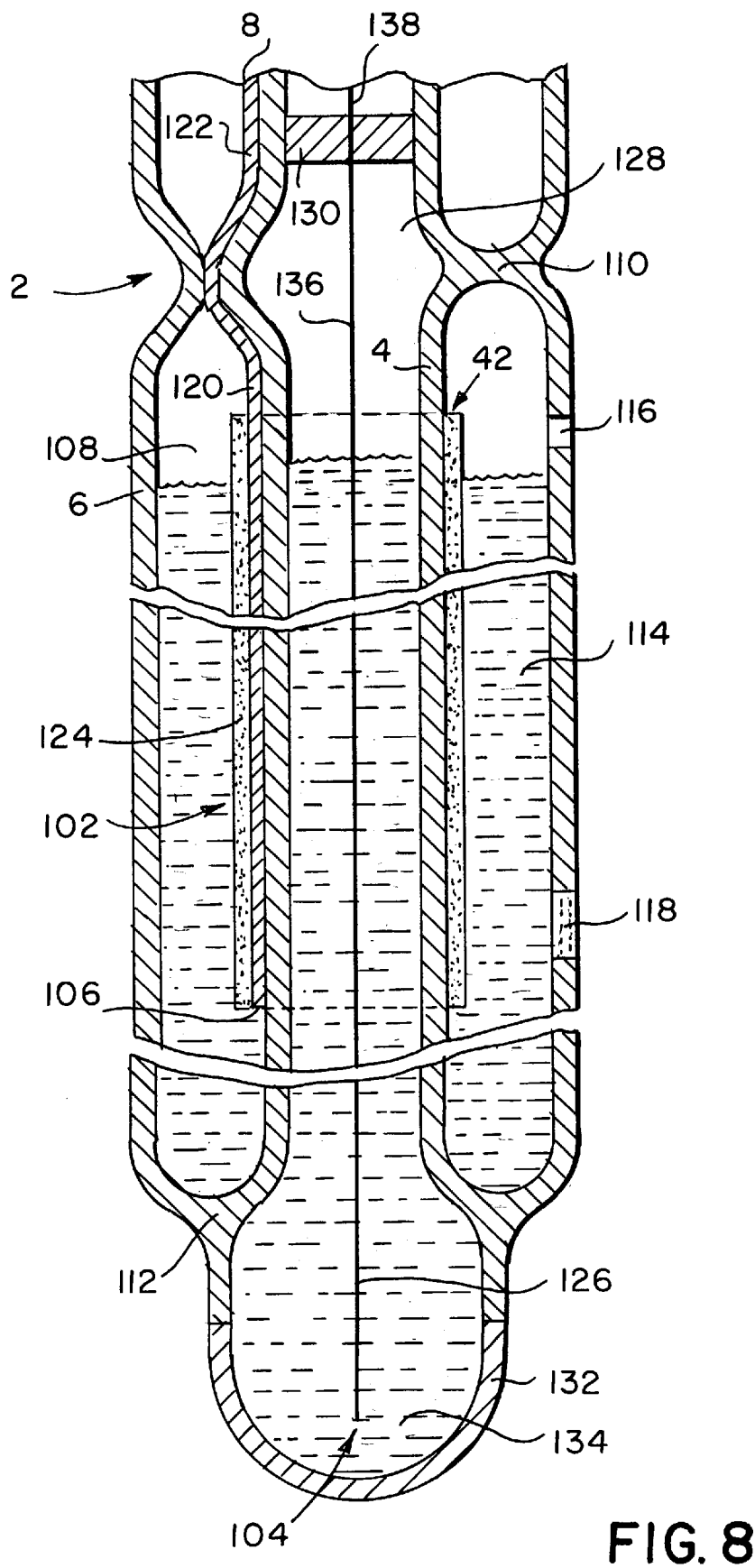
FIG. 8 is a cross-sectional view of an electrochemical sensor for measuring pH values having a medium-tight connection made in accordance with the method of the present invention.

FIG. 8 shows an electrochemical sensor in the vertical operating position which is formed by the method of the present invention. The sensor is an ion-selective sensor that is formed as a single rod measurement chain for determining pH values using a reference element 102 and a working element 104. A first or reference electrode 106 is arranged in an annular exterior chamber 108 defined by interior tube 4, exterior tube 6, a first closure area 110 at its upper end, and by a second closure area 112 at its lower end. The first closure area 110 is an annular, medium-tight connection 2 formed in accordance with the method of the present invention, while the second closure area 112 is an annular connection formed by melting together the ends of the glass tubes 4 and 6.

A reference electrolyte solution 114 is contained in the exterior chamber 108 and covers a portion of the first electrode 106. A closable refill opening 116 for refilling reference electrolyte solution 114 is contained within the exterior glass tube 6 between the medium-tight connection 2 and the lower closure area 112. A diaphragm 118 is provided in the exterior glass tube 6 between the medium-tight connection 2 and the lower closure area 112 below the refill opening. The first electrode 106 is connected with an electrical connection point 122 outside the exterior chamber 108 by a continuous electrical line 120 that is enclosed, medium-tight, in connection 2.

The first electrode 106 and the electrical line 120 are formed as a single conductor strip 8 made of silver. The portion of conductor strip 8 that dips into reference electrolyte solution 114 is covered by a shrink-down plastic tubing segment 124 that is used as coverage means 42 that surrounds interior glass tube 4. The reference electrolyte solution 114 may be, for example an aqueous, 3-molar potassium chloride solution that is saturated with silver chloride.

A second or working electrode 126, which is the working electrode of working element 104, is arranged in a generally cylindrical interior chamber 128 that is defined by interior glass tube 4, a medium-tight closure member 130, and a cup-shaped glass membrane cap 132 that is melted together with lower closure area 112. Glass membrane cap 132 is formed of known pH glass. A conventional buffer solution 134 is contained in the interior chamber 128 and covers the lower portion of the second electrode 126. The second electrode 126 is connected with an electrical connection point 138 located outside the second interior chamber 128 by an electrical line 136 which passes through a medium-tight connection in closure member 130. The second electrode 126 and electrical line 136 are preferably made of silver wire. In the example shown, closure member 130 comprises a closure body that is glued into the interior glass tube 4.

In another embodiment of the electrochemical sensor (not shown), the sensor is equipped with a modified working element 104 which allows the sensor to measure redox potentials. The reference element 102 is made as described above.

The electrochemical sensors described above are single-rod measurement chains in which the working element and the reference element are built into a single, preferably tube-shaped, sensor housing. The method according to the invention, however, can also be used to make the individual elements for separate measurement chains where the working element and the reference element are built into separate sensor housings.

While in accordance with the provisions of the Patent Statutes the preferred forms and embodiments of the invention have been illustrated and described, it will be apparent to those of ordinary skill in the art that various changes and modifications may be made without deviating from the inventive concepts set forth above.

What is claimed is:

1. An electrochemical sensor, comprising:
   (a) an elongated vertical housing including a pair of inner and outer glass tubular portions (4, 6) arranged in concentrically spaced relation, said tubular portions having adjacent spaced peripheral surfaces;
   (b) a conductive strip (8) extending longitudinally of and mounted continuously on one of said tubular portion peripheral surfaces, said conductive strip having an end portion that terminates within the exterior annular chamber defined between said tubular portions;

(c) said tubular portions being connected at a first location intermediate the ends of said conductive strip by a first connection (2) defined by a radially outwardly extending annular bulge in said inner tubular portion and a radially inwardly directed constriction on said outer tubular portion, said bulge and said constriction being joined solely by a locally-heat-melted autogenous joint containing the associated portion of said conductive strip;

(d) said tubular portions having end portions that are connected by a second connection (112) defined by a locally-heat-melted joint;

(e) an end cap member (134) closing the bottom of said inner tubular portion, thereby to define an interior chamber within said tubular portion;

(f) a first electrode (106) arranged within said exterior chamber, said first electrode being electrically connected with said conductive strip end portion;

(g) a second electrode contained within said interior chamber;

(h) a reference solution contained within said exterior chamber covering at least a portion of said first electrode; and (i) a buffer solution contained within said interior chamber covering at least a portion of said second electrode.

2. Apparatus as defined in claim 1, and further including a closure member arranged within said interior tubular portion for closing the upper end of said interior chamber.

3. Apparatus as defined in claim 2, wherein said exterior tubular portion contains a refill opening.

4. Apparatus as defined in claim 3, wherein said exterior tubular portion contains a wall opening, and further including a diaphragm closing said wall opening.

5. Apparatus as defined in claim 4, and further comprising a shrink-fit annular layer arranged concentrically about said first electrode and said interior tubular portion.

6. Apparatus as defined in claim 5, wherein said conductive strip and said first electrode are formed from the same material.

7. Apparatus as defined in claim 6, wherein said conductive strip and said first electrode are formed integrally as a single component.

8. Apparatus as defined in claim 7, wherein said first electrode is an ion selective sensor, thereby to allow the sensor to measure pH values.

9. Apparatus as defined in claim 7, wherein said first electrode is a redox sensor, thereby to allow the sensor to measure redox potentials.

* * * * *